Patented Jan. 7, 1936

2,027,093

UNITED STATES PATENT OFFICE 2,027,093

DEODORIZED CALCIUM CHLORIDE

Charles R. Downs, Old Greenwich, Conn., assignor to Weiss and Downs, Inc., New York, N. Y., a corporation of New York No Drawing. Application November 15, 1933, Serial No. 698,123

10 Claims. (Cl. 183—4)

This invention relates to air conditioning and more particularly to the conditioning of air to make the heat of summer more tolerable.

The invention is in the nature of an improvement upon the invention disclosed and claimed in my pending applications Serial No. 629,121, filed August 17, 1932 and Serial No. 672,415, filed May 23, 1933. In said applications disclosure is made of an apparatus and method for extracting moisture from air in warm and humid weather through the action of a deliquescent material such as calcium chloride. The term "deliquescent" as employed throughout this specification and in the claims refers to a substance which in the solid form is capable upon exposure to humid air of becoming moist and finally liquid and which in its liquid form has become moist and finally liquefied after such exposure to humid air. A dehumidifying agent such as calcium chloride may be used to advantage either with or without an attendant cooling of the air since the reduced humidity of the air is more healthful and gives a sensation of coolness as compared with untreated humid air at the same temperature.

In my prior applications referred to above, disclosure is further made of the employment of the calcium chloride or other treating agent in the form of massive lumps so that an abundant and substantially uniform surface of the material may be continuously exposed for contact with the air and liability of clogging the apparatus or the spaces between adjacent pieces of material is avoided. Disclosure is further made of apparatus adapted to collect the solution which drips or flows from the lumps of material and to use such solution as a treating agent for the air in advance of the contact of the air with the solid lumps of material. The air is thus exposed in the first instance to a dilute solution, then to successively more concentrated solutions, and finally to the solid material.

Calcium chloride is employed from which a portion of the water of crystallization has been removed. When such material takes up the water from the air heat is given off and provision is therefore made between the stages of exposure to the solid of means for cooling the air sufficiently to restore it to its original temperature. This avoids the delivery of heated air and keeps down the aqueous tension of the saturated solution on the surface of the solid. These desirable features it is preferred to employ in carrying out the present invention.

When solutions of calcium chloride are evaporated to form lumps suitable for use in my prior applications referred to above, air which has been caused to flow in contact therewith has perceptibly the odor of wet plaster which would make this method of air conditioning objectionable.

It is a feature of the present invention that a deodorizing treatment is combined with the dehumidifying treatment so that the air is dehumidified without being caused to take on an objectionable odor. The deodorizing treatment is further effective to remove or reduce any objectionable odors which may have been present in the air before treatment and the deodorizing is carried out in an economical and convenient manner so as to introduce no objections to the use of the deodorant.

Activated carbon is well adapted for utilization as the deodorizing agent because of its large absorptive capacity. If simply placed in the stream of air issuing from the dehumidifying agent, however, the carbon would have to be in granules of appreciable size to prevent being taken up by the air stream and blown into and distributed about the building or room into which the air is delivered. Activated carbon in granular size is the most expensive form of this material. It is desirable, therefore, to contrive some way of exposing the deodorizing agent in powdered or fine sizes to contact with the air while physically imprisoning it and preventing its being distributed through the air.

Filters and other apparatus adapted to subject the air to the effect of activated carbon after it has left the calcium chloride would of necessity involve the addition of compartments to the mechanism for enabling the air to be thoroughly exposed to the activated carbon. This would increase the resistance to air flow, necessitating the provision of a more powerful blower and the consumption of more power.

In accordance with a preferred embodiment of the present invention, I provide the calcium chloride in lump form as before but thoroughly incorporate in the lumps a small quantity of activated carbon, the carbon being substantially homogeneously mixed with the calcium chloride. With such a composition fresh portions of the activated carbon are progressively exposed as the calcium chloride is consumed. Since the carbon is exposed only as the calcium chloride takes up enough moisture from the air to become dissolved, it is apparent that the carbon will always be exposed in a moist state and will be kept sufficiently moist to prevent its being taken up by the air stream. The carbon moreover, is exposed at a rate proportional to the rate of consumption of the calcium chloride and hence there is always an adequate quantity of the carbon freshly exposed for assuring the delivery of odorless air from the dehumidifying apparatus.

As the lumps of calcium chloride are liquefied and the concentrated solution drains therefrom, (in apparatus such as illustrated in my application Ser. No. 672,415) the activated carbon liberated on the surface of the lumps is conveyed by said solution into the air pre-drying stage where it continues to exercise its deodorizing function.

The lumps of calcium chloride are formed by evaporating a solution of calcium chloride to drive off the water. In accordance with the present invention the activated carbon is added to the boiling solution and mixed with it so that when the evaporation is completed and the mass is allowed to cool and solidify the mixture of the carbon throughout the mass of calcium chloride is substantially uniform. I have found, however, that it is not expedient to attempt to add the activated carbon to the boiling mass in a dry state since the powdered carbon in that case floats on the surface and is blown away to a considerable extent by the escaping steam bubbles.

In accordance with a preferred method of practicing the present invention, therefore, a small quantity of fine activated carbon is first wetted by thoroughly mixing with water and then added to the boiling solution of calcium chloride. The carbon is desirably mixed into the solution in the proportion of substantially two to three pounds of activated carbon to one ton of calcium chloride.

This small amount of activated carbon I have found to be sufficient to completely prevent objectionable odors from being introduced by the treated air into the conditioned space, how much less carbon might be used I am unable to state, a maximum of 2 to 3 lbs of activated carbon per ton of calcium chloride, however, is ample for the purpose of deodorization in the normal dwelling-house air.

Calcium chloride crystals may contain six molecules of water of crystallization. The evaporation of the mixture is carried beyond this point, however, and the heating not discontinued until the water content has been reduced to approximately two molecules. After the heating of the mass is discontinued, the mixture assumes a plastic condition such that it can be easily scored or cut or molded. While in this plastic state the mass is scored or cut and this scoring persists when the mass has been completely solidified and thus facilitates the breaking of the material into lumps of predetermined size and shape.

The activated carbon when distributed in preformed lumps of calcium chloride suitable for use in air conditioning apparatus of the type described in my previous applications, is easy and convenient to handle and may be supplied to the householder or other user of the air conditioning equipment for charging into the apparatus in bags or the like, in much the same manner as coal is supplied for the furnace in winter.

The lumps may be preformed to the desired size and as the activated carbon is distributed therethrough in the right amount for deodorization, the combination is much more efficient and satisfactory than the use of activated carbon in a separate compartment of the apparatus for deodorization.

In the foregoing description calcium chloride has been referred to illustratively as the dehumidifying agent employed, and activated carbon has been referred to illustratively as the deodorizing agent employed. These ingredients are the preferred ingredients both because of their great efficiency in performing the functions required of them and because they are chemically inert to one another. It will be appreciated, however, that other deliquescent substances and other deodorants might be employed without departing from the spirit and scope of the present invention.

While I have described what I believe to be the best embodiment of my invention, it will be understood that instead of intimately mixing the activated carbon with the calcium chloride in the liquid state prior to lump formation that other methods of mixing the carbon with the calcium chloride could be used. It is possible, for example, to add the activated carbon to a solution of calcium chloride which is used for dehumidification as described in my copending applications above referred to. I do not wish, therefore, to be confined to the embodiments described, but what I desire to cover by Letters Patent is set forth in the appended claims.

I claim:
1. A composition of matter for use in air conditioning, consisting of deliquescent lumps of solid non-porous calcium chloride with activated carbon uniformly distributed through each lump.

2. A dehumidifying agent for use in air conditioning apparatus composed of lumps of material, the lumps consisting of a deliquescent solid and finely divided activated carbon homogeneously mixed within the lumps and held thereby.

3. A dehumidifying agent composed of lumps of material, the lumps consisting of solid calcium chloride and a finely divided solid deodorizing agent homogeneously mixed within the lumps and held thereby.

4. A dehumidifying agent composed of lumps of material, the lumps comprising solid calcium chloride and finely divided activated carbon homogeneously mixed within the lumps and held thereby, the ingredients being mixed in the ratio of two or three pounds of carbon to one ton of calcium chloride.

5. The method of dehumidifying air, which comprises causing the air to flow in contact with a deliquescent material and with a solid deodorant, and progressively exposing fresh portions of the deodorant for contact with the air at a rate proportional to the rate of consumption of the deliquescent material.

6. The method of dehumidifying air which comprises providing lumps of homogeneously combined deliquescent material and solid deodorant and causing air to flow in contact with said lumps and progressively exposing fresh portions of the deodorant for contact with the air at a rate proportional to the rate of consumption of the deliquescent material.

7. The method of dehumidifying air, which comprises causing the air to flow in contact with a deliquescent material in lump form having a solid deodorant uniformly distributed therethrough, and progressively exposing fresh portions of the deodorant for contact with the air at a rate proportional to the rate of liquefaction of the deliquescent material.

8. The method of dehumidifying air which comprises causing the air to flow in contact with a solution of calcium chloride having a quantity of finely divided activated carbon mixed therein, and subsequently causing the air to flow in contact with lumps of homogeneously combined calcium chloride and activated carbon.

9. As an article of manufacture for use in air conditioning apparatus, preformed lumps consisting of solid calcium chloride and finely divided activated carbon distributed within the lump and held thereby.

10. The method of dehumidifying air which comprises causing the air to flow in contact with solid calcium chloride and with activated carbon and progressively exposing fresh portions of the activated carbon for contact with the air at a rate proportional to the rate of consumption of the solid calcium chloride.

CHARLES R. DOWNS.